United States Patent [19]

Ito

[11] Patent Number: 5,811,013

[45] Date of Patent: Sep. 22, 1998

[54] OIL SEPARATING METHOD

[75] Inventor: Hirotsugu Ito, Chita, Japan

[73] Assignee: FSK Inc., Chita, Japan

[21] Appl. No.: 578,731

[22] Filed: Dec. 26, 1995

[51] Int. Cl.[6] .............................. C02F 1/24; B01D 17/035
[52] U.S. Cl. .......................... 210/705; 210/708; 210/725; 210/727; 210/728; 210/729; 210/221.2
[58] Field of Search ..................... 210/705, 706, 210/703, 708, 729, 725, 727, 728, 221.2

[56] References Cited

U.S. PATENT DOCUMENTS

| | | |
|---|---|---|
| 2,730,190 | 1/1956 | Brown . |
| 2,759,607 | 8/1956 | Boyd . |
| 2,766,203 | 10/1956 | Brown . |
| 2,983,677 | 5/1961 | Boyd . |
| 3,707,464 | 12/1972 | Burns . |
| 3,959,131 | 5/1976 | Ramirez . |
| 4,522,151 | 6/1985 | Arbisi et al. . |
| 4,569,785 | 2/1986 | Bellos . |
| 5,080,802 | 1/1992 | Cairo . |
| 5,128,046 | 7/1992 | Marble . |
| 5,167,878 | 12/1992 | Arbisi et al. . |
| 5,207,920 | 5/1993 | Jones . |
| 5,302,296 | 4/1994 | Evain . |
| 5,332,506 | 7/1994 | Marble . |
| 5,433,863 | 7/1995 | Braden . |

FOREIGN PATENT DOCUMENTS

| | | |
|---|---|---|
| 0 130 943 | 1/1985 | European Pat. Off. . |
| 49-50744 | 5/1974 | Japan . |
| 53-27171 | 3/1978 | Japan . |
| 54-102662 | 8/1979 | Japan . |
| 57-187693 | 11/1981 | Japan . |
| 57-194010 | 11/1982 | Japan . |
| 63-51604 | 4/1988 | Japan . |
| 63-278507 | 11/1988 | Japan . |
| 5-285305 | 11/1993 | Japan . |
| 1 492 696 | 11/1977 | United Kingdom . |
| WO 89/04208 | 5/1989 | WIPO . |
| WO 90/14310 | 11/1990 | WIPO . |
| WO 92/08533 | 5/1992 | WIPO . |

OTHER PUBLICATIONS

Derwent Abstract, WPI Accession No. 76–74563X/40 of JP A–51–093 550 published Aug. 17, 1976.

*Primary Examiner*—Thomas M. Lithgow
*Attorney, Agent, or Firm*—Frishauf, Holtz, Goodman, Langer & Chick, P.C.

[57] ABSTRACT

Disclosed is an oil separating method in which oil-contaminated water in a separation tank is mixed with air bubbles in a bubble-generating apparatus provided at the bottom of the separation tank to jet out said air-water mixture into the separation tank, wherein a surfactant and/or an antifoamer are(is) previously added to the oil-contaminated water.

16 Claims, 10 Drawing Sheets

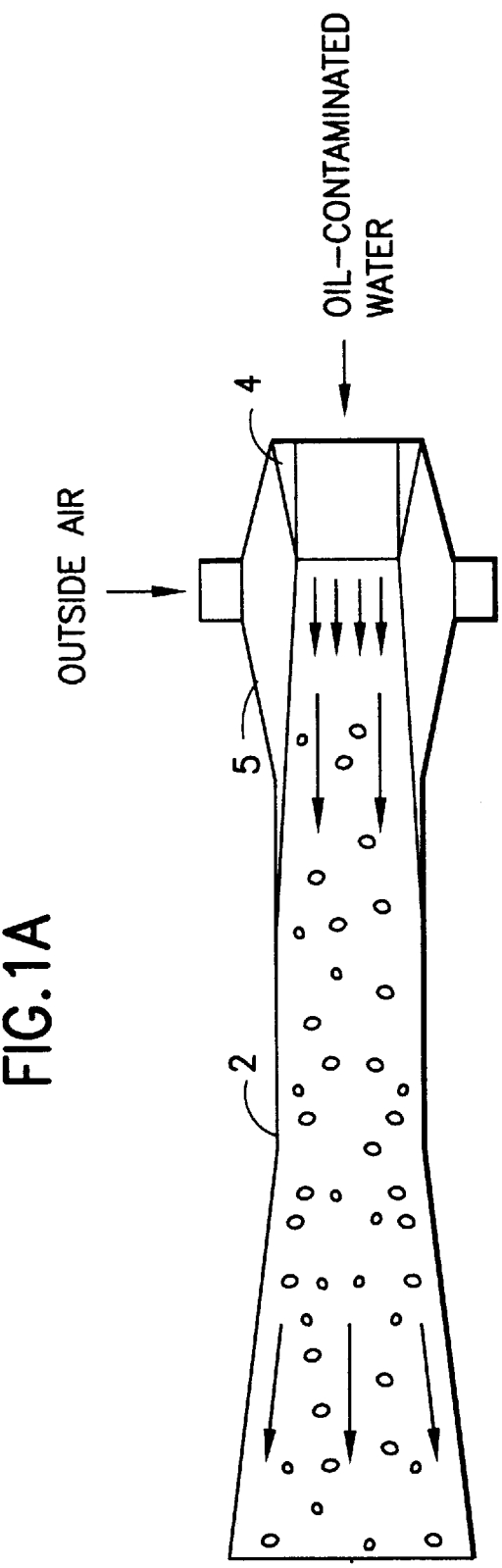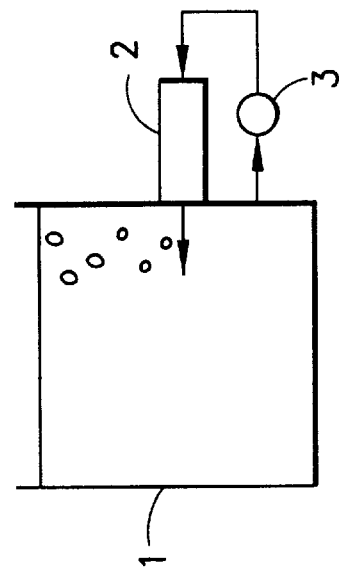

OIL SEPARATING METHOD

BACKGROUND OF THE INVENTION

This invention relates to an oil separating method to be used, for example, in the case of separating an oil contained in aqueous washing water in an emulsion state and reusing purified water.

There has conventionally been known an oil separating method in which air is blown in oil-contaminated water, and an oil is floated with bubbles of blown air and collected at a water surface to purify the oil-contaminated water. However, in this conventional method, for example, even when air is blown in water containing 6,000 ppm of the oil over 10 hours, the oil concentration of a treated water can be lowered only to about 4,000 ppm, so that the method is not satisfactory in the point of separation efficiency.

SUMMARY OF THE INVENTION

An object of the present invention is to provide an oil separating method by which the conventional problems described above can be solved and an oil contained in water in an emulsion state can be separated from water with high separation efficiency.

The first enviroment of the invention is an oil separating method in which oil-contaminated water in a separation tank is mixed with air bubbles in a bubble-generating apparatus provided at the bottom of the separation tank to jet out said air-water mixture into the separation tank, wherein a surfactant is previously added to the oil-contaminated water. The second embodiment of the invention is an oil separating method in which oil-contaminated water in a separation tank is mixed with air bubbles in a bubble-generating apparatus provided at the bottom of the separation tank to jet out said air-water mixture into the separation tank, wherein a surfactant and an antifoamer are previously added to the oil-contaminated water.

BRIEF DESCRIPTION OF THE DRAWINGS

FIG. 1A is a sectional view showing an embodiment of using an ejector as a bubble-generating apparatus.

FIG. 1B is a schematic view showing the ejector depicted in FIG. 1A in conjunction with a pump and a separation tank.

DESCRIPTION OF THE PREFERRED EMBODIMENTS

Figure 2A:
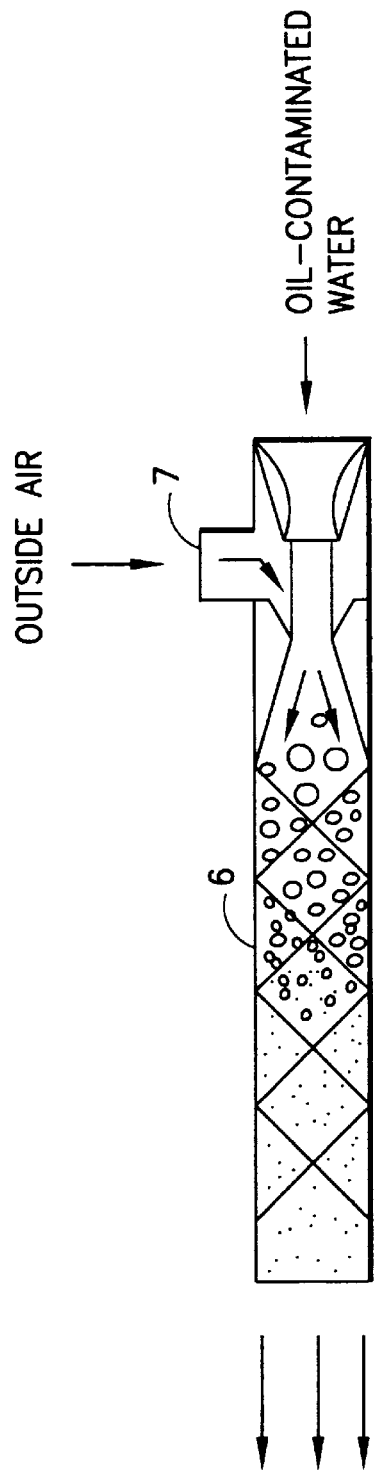
FIG. 2A is a sectional view showing an embodiment of using a static mixer as a bubble-generating apparatus.

As the bubble-generating apparatus, there may be used, for example, an apparatus having a structure as shown in FIG. 1A and FIG. 1B including an ejector 2 and a pump 3 which are provided at the bottom of a separation tank 1. Oil-contaminated water in the separation tank 1, which is sucked by the pump 3, is jetted out through a nozzle 4 of the ejector 2. Outside air is sucked in an air-sucking room 5 by utilizing negative pressure generated by the jet; and the outside air is made into bubbles in the ejector 2 and jetted out into the separation tank 1 together with the oil-contaminated water sucked.

Figure 2B:
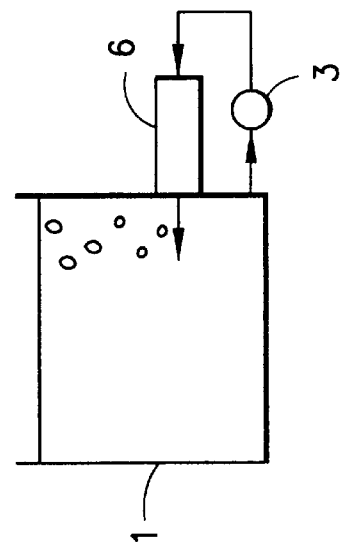
FIG. 2B is a schematic view showing the static mixer depicted in FIG. 1A in conjunction with a pump and a separation tank.

Also, there may be used an apparatus having a structure as shown in FIG. 2A wherein a static mixer 6 is used as a bubble-generating apparatus. As shown in FIG. 2B, air sucked from an air-sucking inlet 7 is jetted out into the separation tank 1 while mixing the air with oil-contaminated water sucked by a pump 3 in the static mixer 6.

Figure 3A:
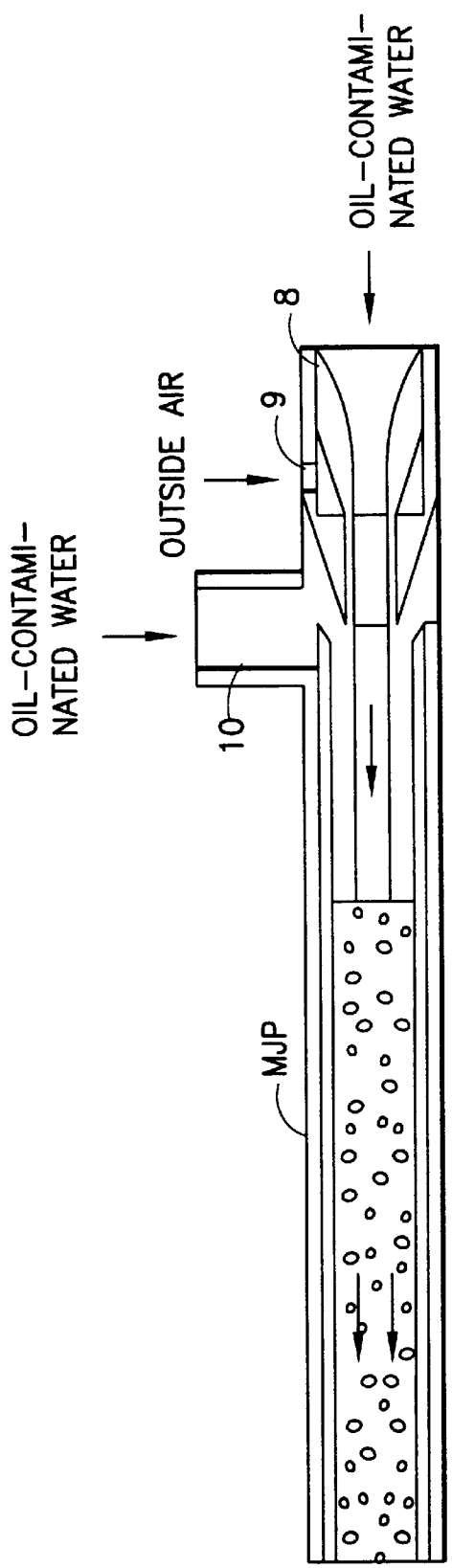
FIG. 3A is a sectional view showing an embodiment of using a nozzle having a special structure (MJP) as a bubble-generating apparatus.
Figure 3B:
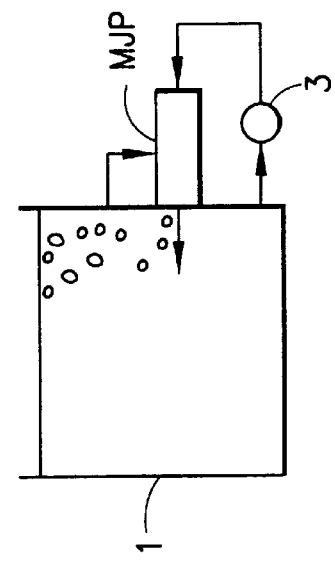
FIGS. 3B is a schematic view showing the nozzle depicted in FIG. 3A in conjunction with a pump and a separation tank.

Further, there may be used a nozzle (Mochizuki Jet Pump, trade name, manufactured by FSK Inc., abbreviation: MJP) having a special structure as shown in FIG. 3A that an air-sucking inlet 9 and an oil-contaminated water-sucking inlet 10 are provided at around the end of a nozzle 8. In addition thereto, there may be used an apparatus having a structure that oil-contaminated water and air are sucked simultaneously from a sucking side by utilizing a vortex turbine pump and mixed under stirring with a turbine impeller thereof. As described above, the kinds and structures of the bubble-generating apparatuses are not particularly limited. However, as shown in the embodiments described below, when the MJP shown in FIG. 3A is used, a particularly excellent separation efficiency can be obtained.

As the surfactant, a cationic, nonionic or ampholytic surfactant is preferably used. As the cationic surfactant, there may be used aliphatic or aromatic quaternary ammonium salts, a heterocyclic quaternary ammonium salt and an aliphatic amine salt. As the aliphatic quaternary ammonium salt, there may be used, for example, alkyl tri-methylammonium chloride and so forth; as the aromatic quaternary ammonium salt, there may be used, for example, alkyl dimethylbenzylammonium chloride and so forth; as the heterocyclic quaternary ammonium salt, there may be used, for example, alkylimidazolinium chloride and so forth; and as the aliphatic amine salt, there may be used, for example, polyoxyethylenealkylamine and so forth. Further, as the nonionic surfactant, there may be used an ether type (e.g. polyoxyethylene alkyl ether and so forth), an ester type (e.g. polyethylene glycol fatty acid ester and so forth), ether-ester type (e.g. polyoxyethylene sorbitan fatty acid ester and so forth) and a nitrogen-containing type (e.g. polyoxyethylenealkylamine and so forth). As the ampholytic surfactant, there may be used imidazolinium betaine (e.g. 2-alkyl-N-carboxymethyl-N-hydroxyethyl imidazolinium betaine and carboxy betaine (e.g. alkyl di-methylbetaine). Further, as the antifoamer, there may be used an alkyl-modified polysiloxane (e.g. dimethylpolysiloxane and so forth), a higher alcohol (e.g. octyl alcohol, 2-ethylhexyl alcohol and so forth), diisooctyl ether and so forth. The amount of the surfactant to be added to oil-contaminated water is preferably 5 to 30 ppm, more preferably 10 to 20 ppm. The amount of the antifoamer to be added is preferably 10 to 40 ppm, more preferably 15 to 30 ppm. If the amounts of the surfactant and the antifoamer exceed 30 ppm and 40 ppm, respectively, their actions on emulsification of an oil are strong, whereby the separation rate of the oil is made slow. On the other hand, if said amounts are less than 10 ppm and 15 ppm, respectively, oil separation itself cannot be effected.

According to the present invention, by adding the surfactant or adding both the surfactant and the antifoamer, agglomeration of oil particles is accelerated, and the agglomerated oil particles are floated with air bubbles, whereby oil separation can be effected with much better efficiency than that of the prior art. The present invention is described in detail by referring to the following embodiments.

Figure 4:
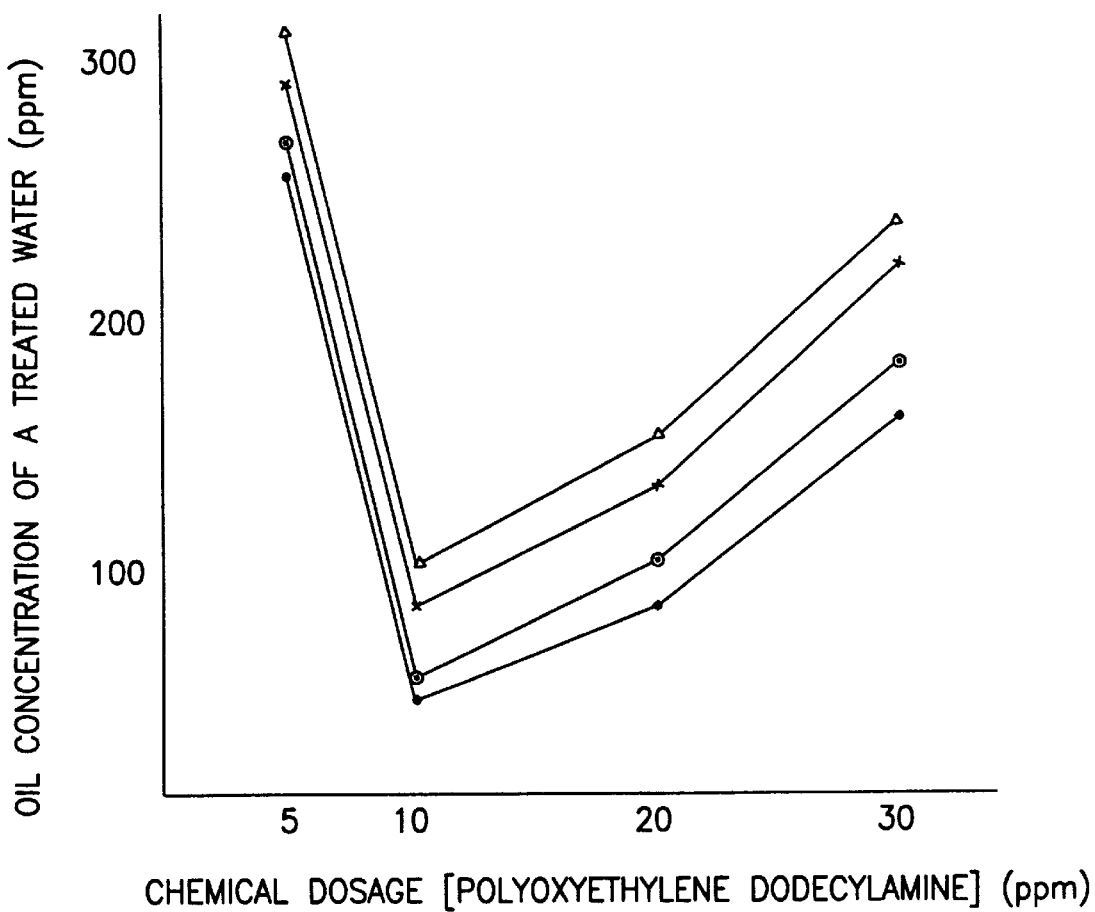
FIG. 4 is a graph showing oil concentrations of a treated water when polyoxyethylenedodecylamine is added at various concentrations to oil-contaminated water as a surfactant.

A predetermined amount of city water was charged into an inner portion of a separation tank having a volume of 250 l, and then a water-insoluble machining oil (produced by Idemitsu Kosan, trade name: DAPHNE CUT ST-30) was charged into the separation tank so that the oil concentration of oil-contaminated water in the separation tank became 6,000 ppm. By actuating a pump 3, the oil-contaminated water in the vicinity of a water surface and air existing on said water surface were sucked from an air-sucking inlet 9 of MJP as a bubble-generating apparatus and the charged city water and water-insoluble machining oil were mixed for 10 minutes to prepare oil-contaminated water containing an oil in an emulsion state. This oil-contaminated water was sucked by a pump 3 at a flow rate of 60 l per minute, mixed with air bubbles in various bubble-generating apparatus and jetted out into the separation tank to effect oil separation. The air-sucking amount at this time was 1.2 l per minute. FIG. 4 shows the results obtained by adding polyoxyethylenedodecylamine (produced by Nippon Oil and Fats Co., Ltd., trade name: NYMEEN L-201, the same applies to the following descriptions) at various concentrations to this oil-contaminated water and carrying out this treatment for 8 hours. In this embodiment, the surfactant was added to the oil-contaminated water received previously in the separation tank, but in a system in which oil-contaminated water is introduced into a separation tank continuously, it is preferred that a surfactant is previously added to the oil-contaminated water to be introduced into the separation tank. The same applies to an antifoamer described below. In FIG. 4, "O", "Δ", "X". and "." show the results obtained by using an ejector, a static mixer, a turbo mixer and MJP as a bubble-generating apparatus, respectively (the same applies to the following figures except for FIG. 10).

In FIG. 4, the oil concentration on the axis of ordinate was measured according to the following manner.

1) By a constant temperature dryer equipped with a thermoregulator, a glass beaker having a volume of 300 cc is dried at 95° C. for 2 hours or longer.

2) By an electronic balance (minimum scale: 1 mg), the weight (defined as $W_o$) of the above dried glass beaker was measured.

3) 100 cc of sample water collected from a lower portion of a separation tank is charged into the above glass beaker the weight of which has been measured, and the weight (defined as $W_{is}$, wherein i=1 to n, and n is the number of sample-collecting times) of said glass beaker is measured by the above electronic balance.

4) The glass beaker containing the above sample water is placed in the above dryer, and said sample water is evaporated (at 95° C. for about 20 hours).

5) The weight (defined as $W_{ie}$, wherein i and n have the same meanings as described above) of the glass beaker in which the sample water has been evaporated is measured, and the oil concentration (defined as $C_i$, wherein i and n have the same meanings as described above) is determined according to the following equation.

$$\{(W_{ie}-W_o)/(W_{is}-W_o)\} \times 10^6 = C_i (\text{ppm}).$$

As shown in FIG. 4, by the treatment for 8 hours, the oil concentrations of the oil-contaminated water were reduced from the initial one of 6,000 ppm to about 40 to 300 ppm. It was found that when the nozzle (MJP) having a special structure shown in FIG. 3A was used as a bubble-generating apparatus, the most excellent separation efficiency was obtained.

Figure 5:
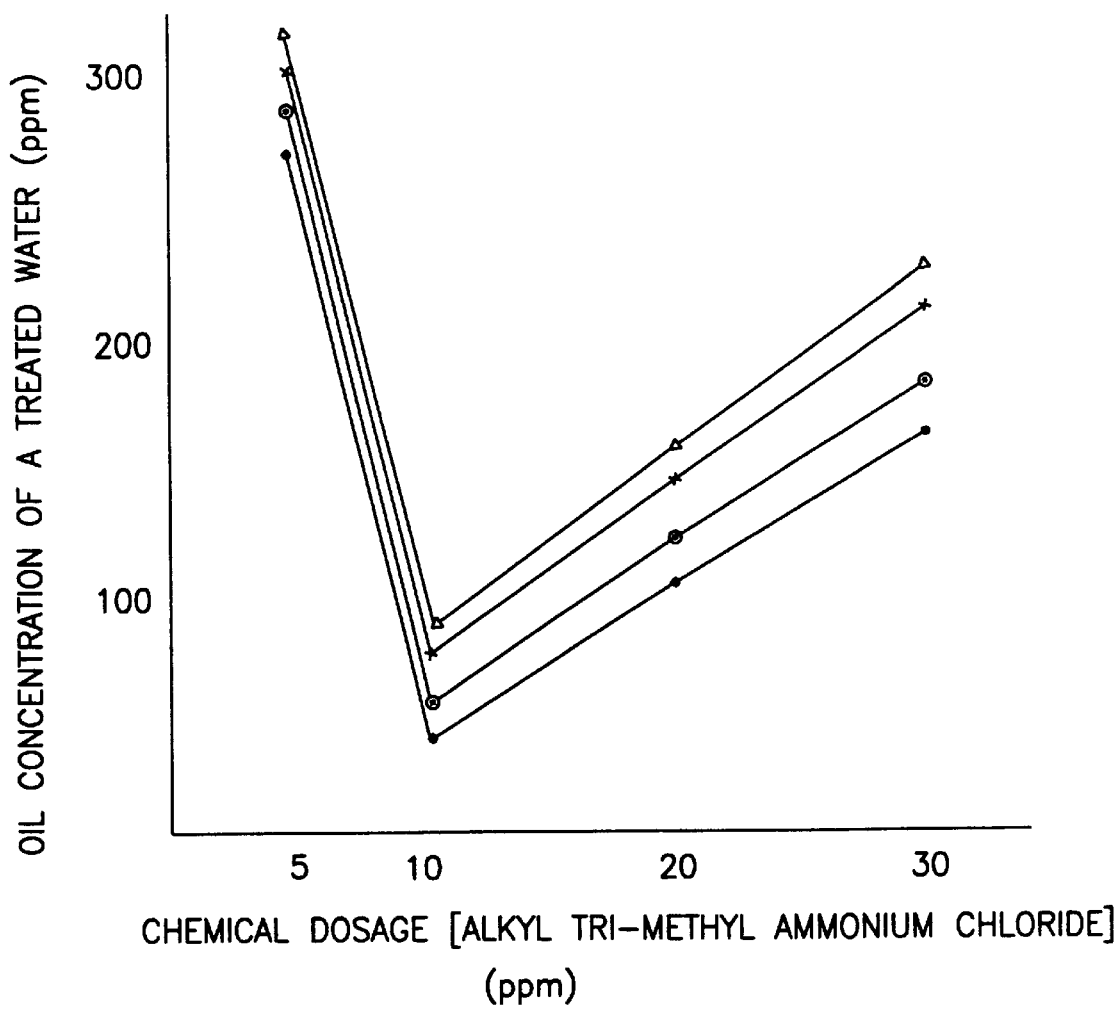
FIG. 5 is a graph showing oil concentrations of a treated water when alkyl tri-methylammonium chloride is added at various concentrations to oil-contaminated water as a surfactant.
Figure 6:
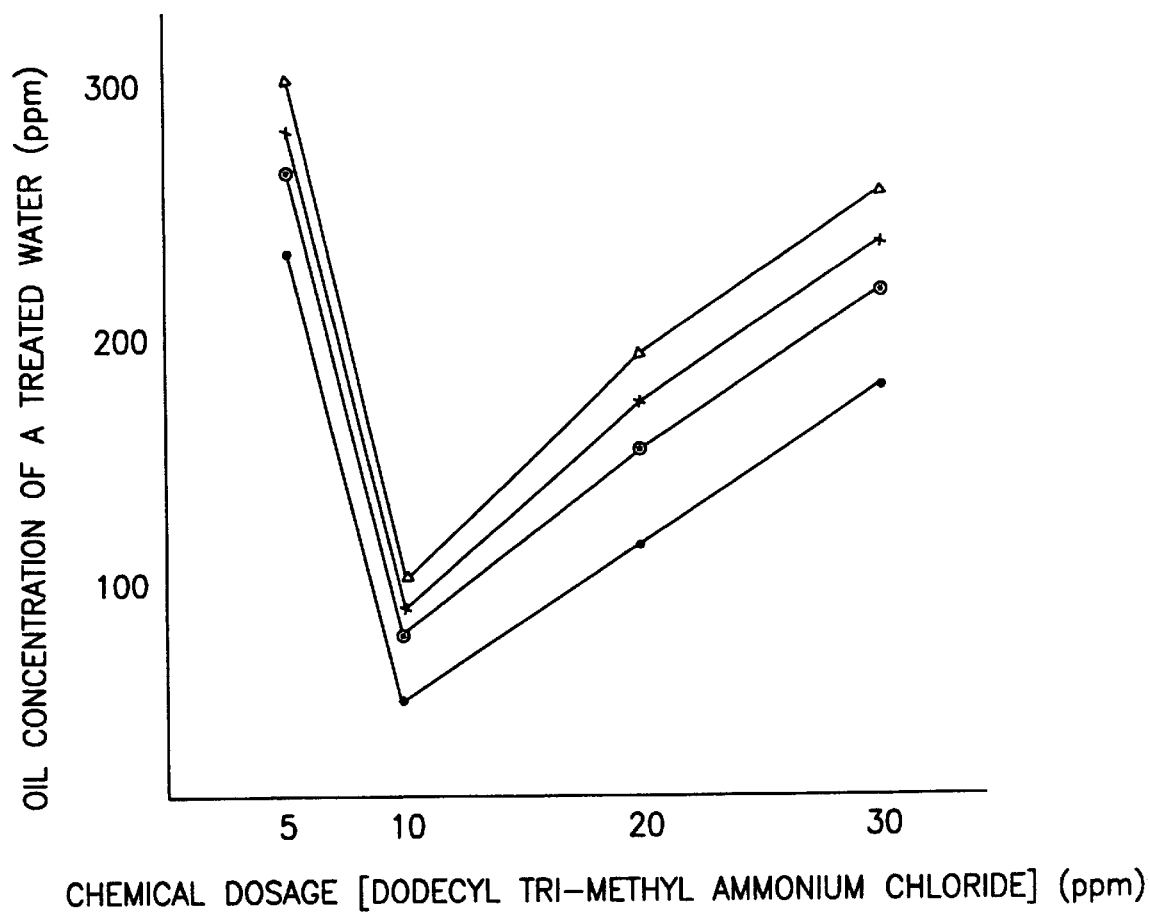
FIG. 6 is a graph showing oil concentrations of a treated water when dodecyl tri-methylammonium chloride is added at various concentrations to oil-contaminated water as a surfactant.
Figure 7:
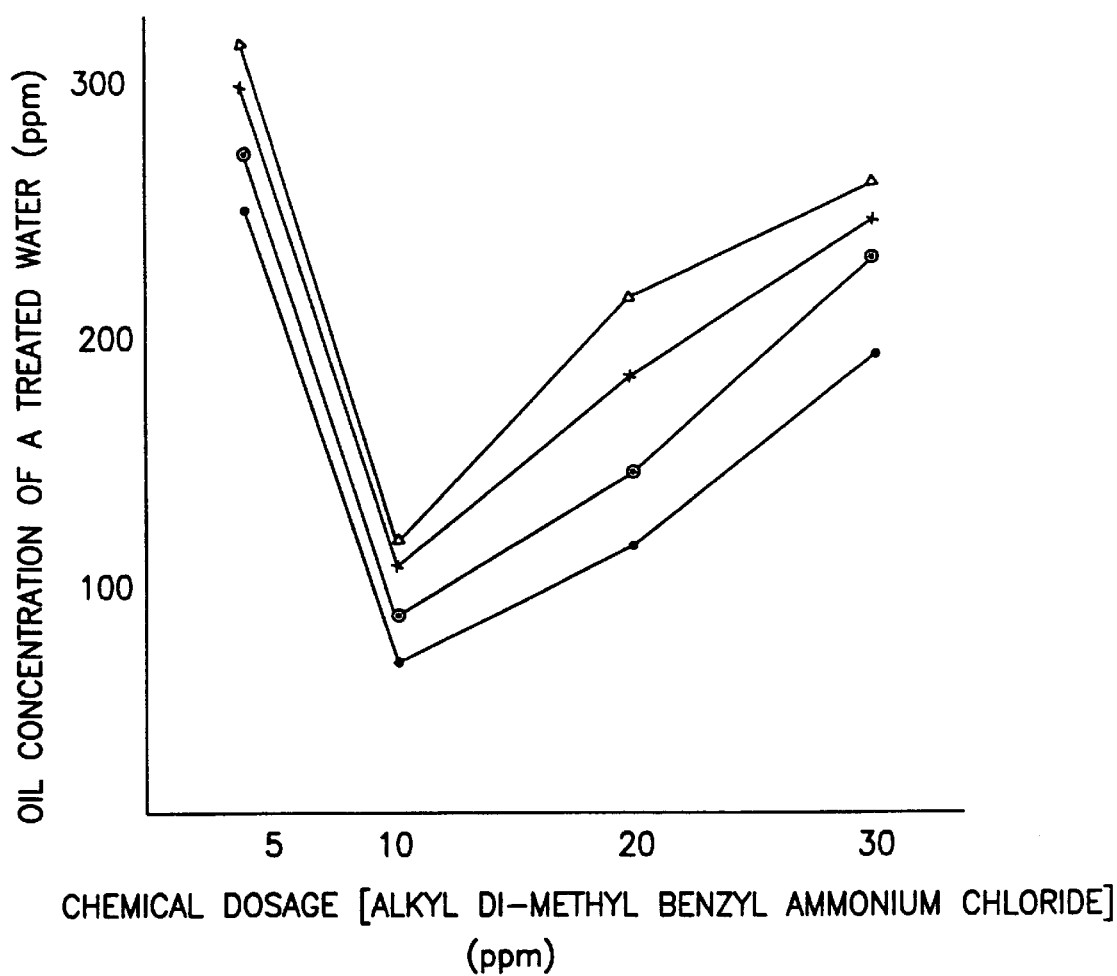
FIG. 7 is a graph showing oil concentrations of a treated water when alkyl di-methyl benzylammonium chloride is added at various concentrations to oil-contaminated water as a surfactant.
Figure 8:
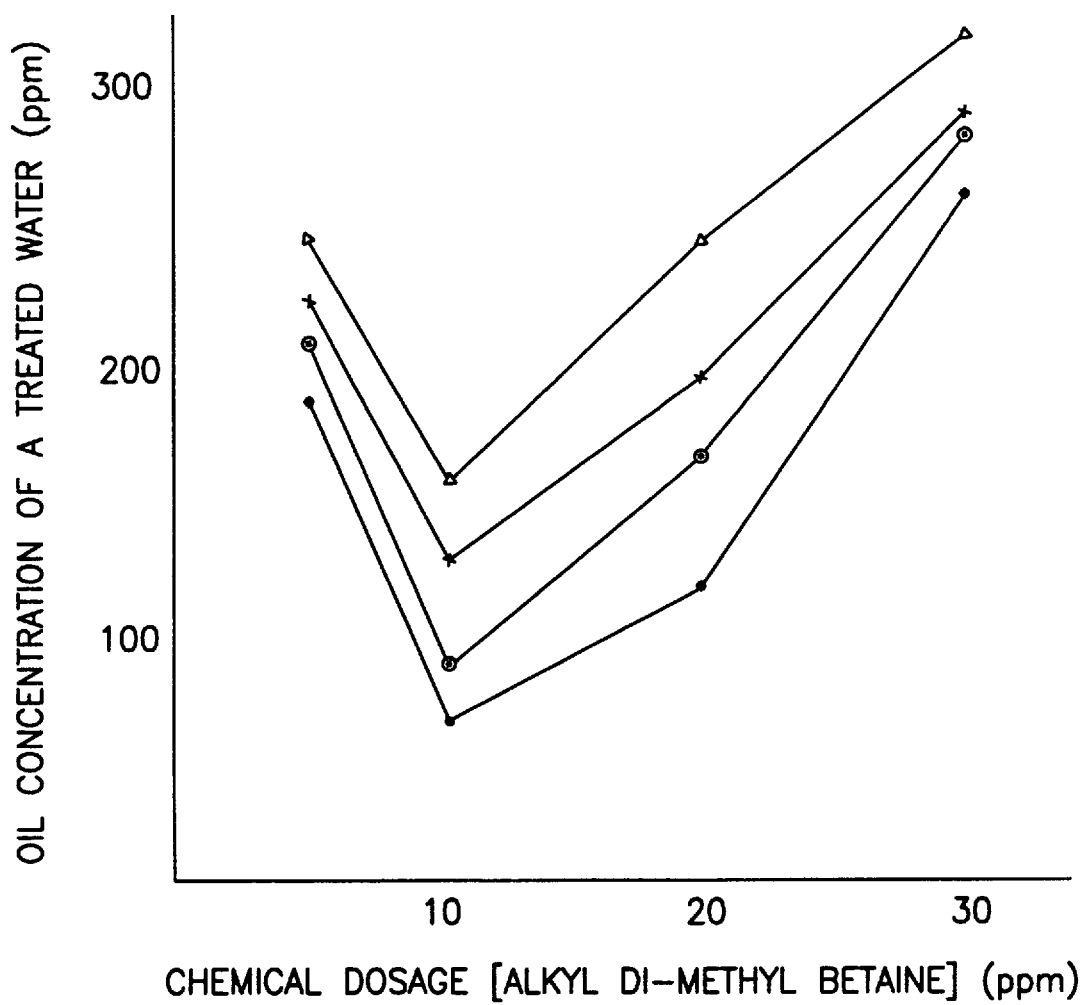
FIG. 8 is a graph showing oil concentrations in a treated water when alkyl di-methylbetaine is added at various concentrations to oil-contaminated water as a surfactant.

In the same manner, the embodiment of adding alkyl trimethylammonium chloride (produced by Nippon Oil and Fats Co., Ltd., trade name: Cation $ABT_2$-500) as a surfactant is shown in FIG. 5; the embodiment of adding dodecyl trimethylammonium chloride (produced by Kao Corp., trade name: QUARTAMIN 24P) as a surfactant is shown in FIG. 6; the embodiment of adding alkyl di-methylbenzylammonium chloride (produced by Nippon Oil and Fats Co., Ltd., trade name: Cation $F_2$-50) as a surfactant is shown in FIG. 7; and the embodiment of adding alkyl di-methylbetaine (produced by Nippon Oil and Fats Co., Ltd., trade name: NISSAN ANON BF) as a surfactant is shown in FIG. 8, respectively.

Figure 9:
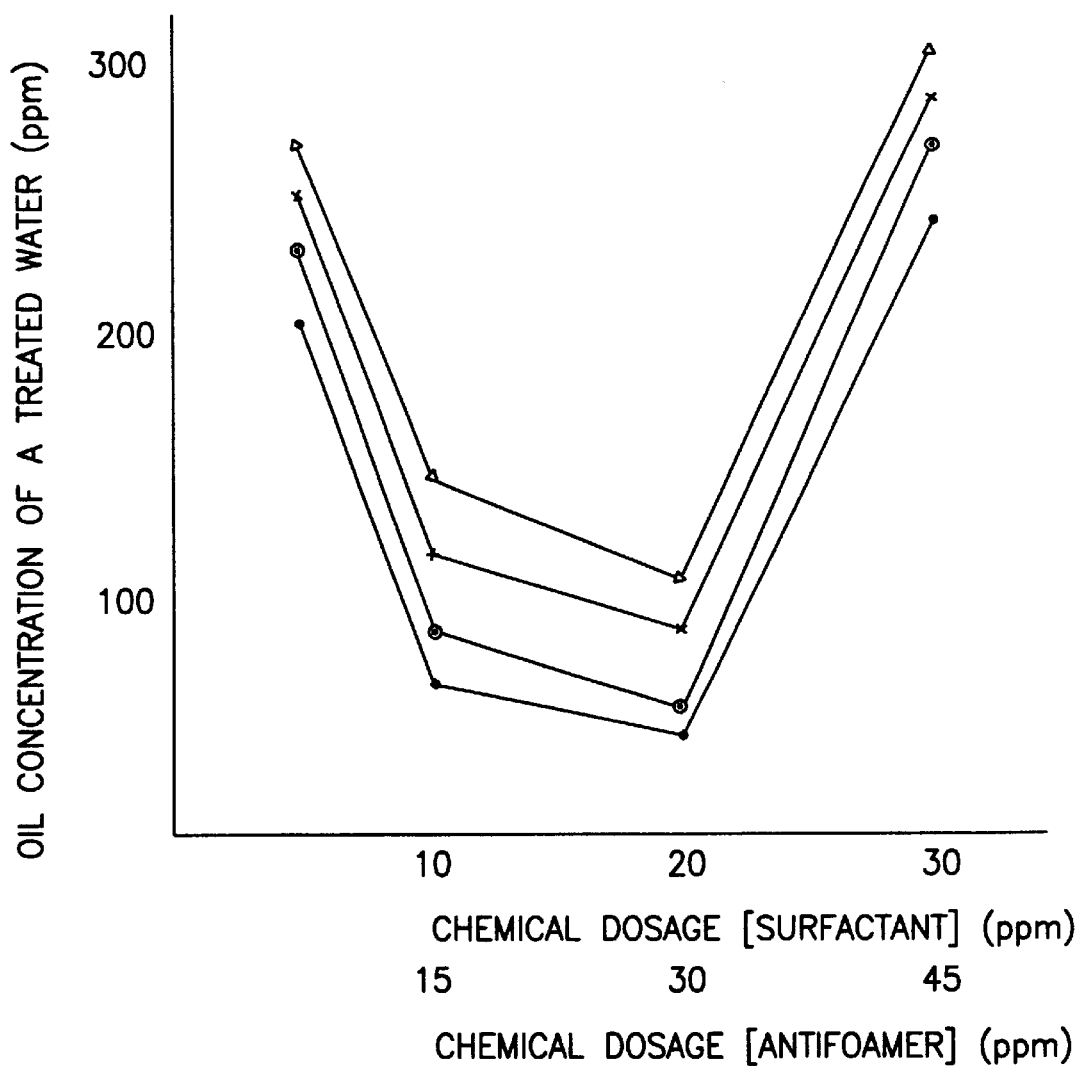
FIG. 9 is a graph showing the results of using polyoxyethylenedodecylamine as a surfactant and dimethylpolysiloxane as an antifoamer in combination.

FIG. 9 is a graph showing the results of using polyoxyethylenedodecylamine as a surfactant and dimethylpolysiloxane (produced by Sinetsu Chemical Co., Ltd., trade name: KM73) as an antifoamer in combination. As can be seen from FIG. 9, when the surfactant and the antifoamer are used in combination in oil-contaminated water, not only it is possible to achieve separation efficiency equivalent to that of the case of using the surfactant alone, but also foaming at the water surface of the separation tank can be suppressed, whereby collection of the separated and floated oil can be carried out easily.

Figure 10:
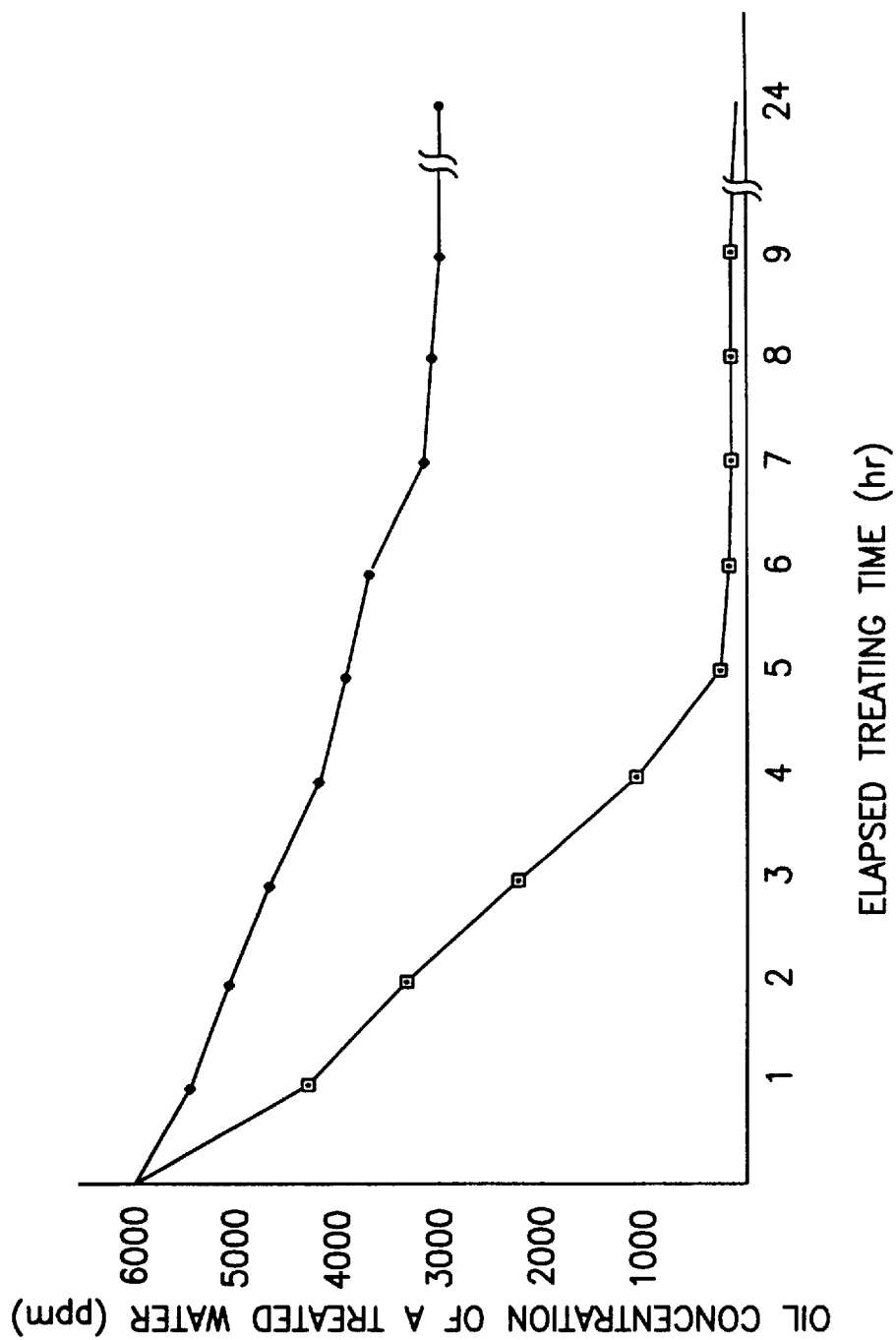
FIG. 10 is a graph showing the results of oil separation only by air bubbles in comparison with the results of oil separation of the present invention (10 ppm of polyoxyethylenedodecylamine is added as a surfactant).

FIG. 10 is a graph showing the results obtained by carrying out oil separation only by air bubbles (using a MJP as a bubble-generating apparatus) without adding surfactant and an antifoamer (Indicated by periods, i.e., in comparison with the results obtained by adding 10 ppm of polyoxyethylenedodecylamine indicated in FIG. 10 by open boxes, i.e. "□". As can be clearly seen from the graph of FIG. 10, while the oil concentration after treatment for 8 hours is about 3,000 ppm in the conventional method carried out without using the surfactant and the antifoamer, the oil concentration is reduced to about 250 ppm even by treatment for 5 hours when the surfactant is used. Thus, it can be seen that the effect of the present invention is significant.

As described above, according to the present invention, agglomeration of oil particles contained in oil-contaminated water in an emulsion state is accelerated by adding a surfactant and/or an antifoamer, and said agglomerated oil particles are floated with air bubbles, whereby oil separation can be effected with much better efficiency than that of the prior art. Thus, the present invention is suitable for the case of separating an oil contained in aqueous washing water and reusing water, so that the present invention contributes greatly to industry.

I claim:

1. A method for separating oil from oil-contaminated water comprising:
   (a) introducing oil-contaminated water into a separation tank;
   (b) adding 5 to 30 ppm of a surfactant to the oil-contaminated water, said surfactant being selected from the group consisting of an aromatic quaternary ammonium salt, an alkyl imidazolinium salt, a polyoxyethylene alkylamine, an imidazolinium betaine and a carboxy betaine;
   (c) circulating a portion of the oil-contaminated water from the separation tank in step (b) to a bubble generating apparatus and introducing air into said bubble generating apparatus to mix the oil-contaminated water with air bubbles; and
   (d) jetting the resultant mixture of said oil-contaminated water and air bubbles from step (c) into the oil-contaminated water contained in the separation tank, to cause flotation of particles of the oil by the air bubbles.

2. The method according to claim 1, wherein in addition to the surfactant, an antifoamer is added to the oil-contaminated water.

3. The method according to claim 1, wherein the surfactant is added in an amount of 10 to 20 ppm.

4. The method according to claim 2, wherein the surfactant is added in an amount of 10 to 20 ppm and the antifoamer is added in an amount of 15 to 30 ppm.

5. The method according to claim 1, wherein the surfactant is an alkyl dimethylbetaine.

6. The method according to claim 1, wherein the bubble generating apparatus is an ejector.

7. The method according to claim 1, wherein the bubble generating apparatus is a static mixer.

8. The method according to claim 1, wherein the bubble generating apparatus is a nozzle having a first end thereof adjacent the separation tank and a second end thereof opposite to the first end, the nozzle comprising an air-sucking inlet and an oil-contaminated water-sucking inlet which are provided adjacent the second end of the nozzle.

9. The method according to claim 1, wherein the surfactant is selected from the group consisting of alkyl dimethylbenzylammonium chloride, alkyl imidazolinium chloride, 2-alkyl-N-carboxymethyl-N-hydroxyethyl imidazolinium betaine and an alkyl dimethyl betaine.

10. The method according to claim 1, wherein the surfactant is polyoxyethylene dodecylamine.

11. The method according to claim 1, wherein the surfactant is alkyl dimethylbenzylammonium chloride.

12. The method according to claim 1, wherein the surfactant is added to the oil-contaminated water prior to the introduction of said oil-contaminated water into the separation tank.

13. The method according to claim 2, wherein the antifoamer is added to the oil-contaminated water prior to the introduction of said oil-contaminated water into the separation tank.

14. The method according to claim 1, wherein the oil-contaminated water introduced into the separation tank is in the form of an emulsion.

15. A method for separating oil from oil-contaminated water comprising:
   (a) introducing oil-contaminated water into a separation tank;
   (b) adding 5 to 30 ppm of a surfactant to the oil-contaminated water, said surfactant being selected from the group consisting of an aliphatic quaternary ammonium salt, an aromatic quaternary ammonium salt, an alkyl imidazolinium salt, an aliphatic amine salt, a polyoxyethylene alkylamine, an imidazolinium betaine and a carboxy betaine;
   (c) adding an antifoamer to the oil-contaminated water, wherein the antifoamer is selected from the group consisting of dimethylpolysiloxane, octyl alcohol, 2-ethylhexyl alcohol and diisooctyl ether;
   (d) circulating a portion of the oil-contaminated water from the separation tank to a bubble generating apparatus and introducing air into said bubble generating apparatus to mix the oil-contaminated water with air bubbles; and
   (e) jetting the resultant mixture of said oil-contaminated water and air bubbles from step (d) into the oil-contaminated water contained in the separation tank, to cause flotation of particles of the oil by the air bubbles.

16. The method according to claim 15, wherein said surfactant is selected from the group consisting of an aromatic quaternary ammonium salts an alkyl imidazolinium salt, an aliphatic amine salt, a polyoxyethylene alkylamine, an imidazolinium betaine and carboxy betaine.

* * * * *